United States Patent
Huang

(10) Patent No.: US 12,531,406 B2
(45) Date of Patent: Jan. 20, 2026

(54) OVERVOLTAGE PROTECTION CIRCUIT AND DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Jianshun Huang, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 143 days.

(21) Appl. No.: 18/401,520

(22) Filed: Dec. 31, 2023

(65) Prior Publication Data

US 2025/0079825 A1    Mar. 6, 2025

(30) Foreign Application Priority Data

Aug. 30, 2023  (CN) .......................... 202311116689.X

(51) Int. Cl.
  *H02H 3/20*  (2006.01)
(52) U.S. Cl.
  CPC .................... *H02H 3/20* (2013.01)
(58) Field of Classification Search
  CPC ................. H02H 3/20; H02H 3/202
  USPC ....................................... 361/91.5
  See application file for complete search history.

(56) References Cited

U.S. PATENT DOCUMENTS

| 6,901,520 B2* | 5/2005 | Odaohhara | G06F 1/28 361/88 |
| 8,508,900 B2* | 8/2013 | Tsugawa | H02H 3/202 361/91.1 |
| 11,128,292 B2* | 9/2021 | Chow | H03K 17/163 |
| 11,791,624 B2* | 10/2023 | Fang | H02J 7/00308 361/56 |
| 11,881,183 B2* | 1/2024 | Zhou | H02H 3/20 |

(Continued)

FOREIGN PATENT DOCUMENTS

| CN | 207283140 U | * 4/2018 |
| CN | 209313809 U | * 8/2019 |

(Continued)

*Primary Examiner* — Dharti H Patel
(74) *Attorney, Agent, or Firm* — The Roy Gross Law Firm, LLC; Roy D. Gross

(57) ABSTRACT

A circuit includes a voltage input end, a voltage output end, a first control switch and a protection module; the voltage input end is configured to be applied with a power supply voltage; the voltage input end and the voltage output end are connected via a first line; the first control switch is connected between the voltage input end and the voltage output end and located on the first line; the protection module is connected between the voltage input end and the voltage output end and is located on a second line connected in parallel with the first line, the protection module is connected to the first control switch and configured to control the first control switch to turn off to be disconnected from the first line when the power supply voltage is greater than a preset voltage. The circuit has an overvoltage protection function.

14 Claims, 4 Drawing Sheets

(56) References Cited

U.S. PATENT DOCUMENTS

| | | | |
|---|---|---|---|
| 2006/0012929 A1* | 1/2006 | Chen | H02H 9/004 361/91.1 |
| 2008/0186644 A1* | 8/2008 | Migliavacca | G05F 1/571 361/86 |
| 2009/0097181 A1* | 4/2009 | Tamegai | H02J 7/00308 361/91.5 |
| 2012/0044602 A1* | 2/2012 | Huang | G05F 1/571 361/18 |
| 2013/0016448 A1* | 1/2013 | George | H02H 7/1222 361/91.1 |
| 2013/0279054 A1* | 10/2013 | Krajci | H02H 3/20 361/91.5 |
| 2023/0163588 A1* | 5/2023 | Ding | H02J 7/00308 361/91.5 |
| 2025/0079825 A1* | 3/2025 | Huang | H02H 3/202 |
| 2025/0182707 A1* | 6/2025 | Huang | G09G 3/3406 |

FOREIGN PATENT DOCUMENTS

| | | | | |
|---|---|---|---|---|
| CN | 209767685 U | * | 12/2019 | |
| CN | 214492776 U | * | 10/2021 | |
| CN | 114374314 A | * | 4/2022 | H02M 1/08 |
| CN | 216489743 U | * | 5/2022 | |
| CN | 114999408 A | * | 9/2022 | G09G 3/3406 |
| CN | 115986692 A | * | 4/2023 | |

\* cited by examiner

OVERVOLTAGE PROTECTION CIRCUIT AND DISPLAY PANEL

CROSS REFERENCE TO RELATED APPLICATION

This application claims the priority of Chinese Patent Application No. 202311116689.X, filed on Aug. 30, 2023, the disclosure of which is incorporated herein by reference in its entirety.

FIELD OF THE DISCLOSURE

The present application relates to driving techniques for display panels, and more particularly to an overvoltage protection circuit and a display panel.

BACKGROUND

In designing electronic circuits, it usually needs to stabilize power supply voltage or external input voltage supplied to integrated circuits (ICs). That is, when the voltage is too high, it needs to activate overvoltage protection to protect the electronics.

However, how to keep the voltage input to the ICs stable is a technical problem that needs to be solved urgently by a person skilled in the art.

SUMMARY

The embodiments of the present application provide an overvoltage protection circuit and a display panel, for achieving an overvoltage protection function, avoiding voltage loss and keeping voltage stable.

In a first aspect, the embodiments of the present invention provide an overvoltage protection circuit, including:
- a voltage input end, a voltage output end, a first control switch and a protection module;
- the voltage input end is configured to be applied with a power supply voltage;
- the voltage input end and the voltage output end are connected via a first line;
- the first control switch is connected between the voltage input end and the voltage output end and is located on the first line;
- the protection module is connected between the voltage input end and the voltage output end and is located on a second line connected in parallel with the first line, the protection module is connected to the first control switch, and the protection module is configured to control the first control switch to turn off to be disconnected from the first line when the power supply voltage is greater than a preset voltage.

In some embodiments, the protection module includes:
- a voltage conversion unit, configured to be applied with the power supply voltage and output a turn-off signal when the power supply voltage is greater than the preset voltage;
- a switch unit, configured to control the first control switch to turn off when being applied with the turn-off signal, to be disconnected from the first line.

In some embodiments, the voltage conversion unit is further configured to output a turn-on signal when the power supply voltage is less than or equal to the preset voltage;
the switch unit is further configured to control the first control switch to turn on when being applied with the turn-on signal, to be connected to the first line.

In some embodiments, the overvoltage protection circuit further includes a second control switch having the same channel type as the first control switch,
wherein the second control switch is reversely connected to the first control switch, and the second control switch is located on the first line and connected between the voltage input end and the voltage output end.

In some embodiments, the voltage conversion unit includes a voltage conversion chip, and the switch unit includes a first resistor and a third control switch;
- a voltage input pin of the voltage conversion chip is applied with the power supply voltage;
- a voltage output pin of the voltage conversion chip is connected to one end of the first resistor to output the turn-off signal or a turn-on signal;
- the other end of the first resistor is connected to a first electrode of the third control switch, and a second electrode of the third control switch is grounded;
- a third electrode of the third control switch is connected to the first electrode of the first control switch.

In some embodiments, the overvoltage protection circuit further includes a second resistor,
- one end of the second resistor is connected to the voltage input end, the voltage input pin and the second electrode of the first control switch;
- the other end of the second resistor is connected to the first electrode of the first control switch and the first electrode of the third control switch.

In some embodiments, if the third control switch is an N-type MOS transistor and the first control switch is a P-type MOS transistor, then the first electrode, the second electrode and the third electrode of the third control switch are a gate electrode, a source electrode and a drain electrode respectively, and the first electrode, the second electrode and the third electrode of the first control switch are the gate electrode, the drain electrode and the source electrode respectively.

In some embodiments, if the third control switch is an NPN transistor and the first control switch is a P-type MOS transistor, then the first electrode, the second electrode and the third electrode of the third control switch are a base electrode, an emitter electrode and a collector electrode respectively, and the first electrode, the second electrode and the third electrode of the first control switch are a gate electrode, a drain electrode and a source electrode respectively.

In some embodiments, the protection module further includes a bidirectional transient-voltage-suppression diode;
- one end of the bidirectional transient-voltage-suppression diode is connected to the voltage input end, the voltage input pin and the voltage output end;
- the other end of the bidirectional transient-voltage-suppression diode is grounded.

In a second aspect, the embodiments of the present application further provides a display panel. The display panel includes a overvoltage protection circuit, which comprises:
- a voltage input end, a voltage output end, a first control switch and a protection module;
- the voltage input end is configured to be applied with a power supply voltage;
- the voltage input end and the voltage output end are connected via a first line;
- the first control switch is connected between the voltage input end and the voltage output end and is located on the first line;

the protection module is connected between the voltage input end and the voltage output end and is located on a second line connected in parallel with the first line, the protection module is connected to the first control switch, and the protection module is configured to control the first control switch to turn off to be disconnected from the first line when the power supply voltage is greater than a preset voltage.

The embodiments of the present application provide an overvoltage protection circuit and a display panel. In this application, two lines are provided between the voltage input end and the voltage output end. On the first line, the voltage input end and the voltage output end are connected via the first control switch. On the second line, the voltage input end and the voltage output end are connected via the protection module. In this way, the overvoltage protection circuit realizes real-time monitoring of the power supply voltage by using the protection module. When the power supply voltage is greater than the preset voltage, the protection module controls the first control switch to break up the connection of first line between the voltage input end and the voltage output end to carry out the overvoltage protection function, and this can avoid voltage loss and achieve the effect of keeping voltage stable.

BRIEF DESCRIPTION OF THE DRAWINGS

For explaining the technical solutions used in the embodiments of the present application more clearly, the appended figures to be used in describing the embodiments will be briefly introduced in the following. Obviously, the appended figures described below are only some of the embodiments of the present application, and those of ordinary skill in the art can further obtain other figures according to these figures without making any inventive effort.

DETAILED DESCRIPTION OF PREFERRED EMBODIMENTS

Figure 1:
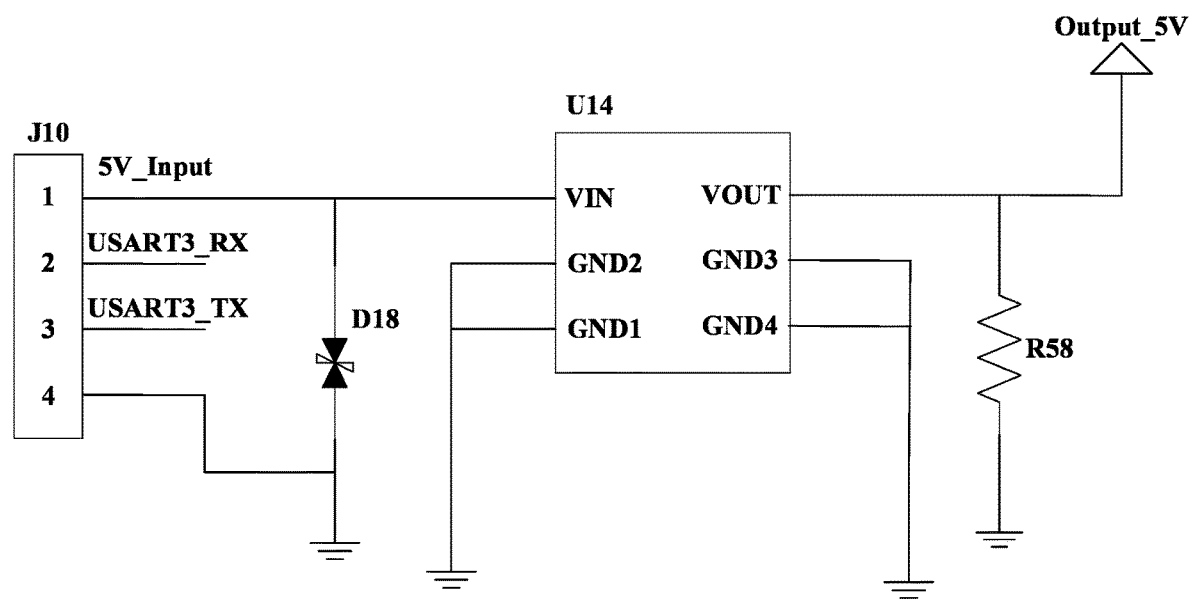
FIG. 1 is a schematic diagram illustrating the principle of an overvoltage protection circuit of the present application.

The technical solutions in the embodiments of the present application will be clearly and completely described below with reference to appended drawings of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope the present application.

In the description of the present application, it is to be understood that the orientation or positional relationship indicated by the terms "one end", "the other end", and the like are based on the relationship of the position or orientation shown in the drawings, which is only for the purpose of facilitating description of the present application and simplifying the description, but is not intended to or implied that the device or element referred to must have a specific orientation, and be constructed and operated in a particular orientation. Therefore, it should not be construed as a limitation of the present disclosure. In addition, the terms "first" and "second" are used for descriptive purposes only, and should not be taken to indicate or imply relative importance, or implicitly indicate the indicated number of technical features. Thus, by defining a feature with "first" or "second", it may explicitly or implicitly include one or more features. In the description of the present application, "a plurality" means two or more unless explicitly defined.

In the description of the present application, it should be noted that unless otherwise explicitly specified or limited, the terms "connected", and "connection" should be construed broadly, for example, a fixed connection, a removable connection, or integrally connected. These terms may be a mechanical connection, and may also be connection or communication. Moreover, these terms can be directly attached, be indirectly connected through an intermediate medium, and may be internally communicated with two components or the interaction relationship between two components. For persons skilled in the art, they can understand the specific meaning of the terms in the present application based on specific conditions.

The following disclosure provides a plurality of different embodiments or examples to implement different structures of this application. To simplify the disclosure of this application, the following describes components and settings in particular examples. Certainly, the examples are merely for illustrative purposes, and are not intended to limit this application. In addition, in this application, reference numerals and/or reference letters may be repeated in different examples. This repetition is for the purpose of simplicity and clarity, and does not in itself indicate a relationship between the various embodiments and/or settings that are discussed. In the above embodiments, different emphasis is placed on respective embodiments, and reference may be made to related depictions in other embodiments for portions not detailed in a certain embodiment.

The display panel provided in the embodiments of the present application can be used for mobile phones, tablet computers, desktop computers, laptop computers, e-readers, handheld computers, electronic display screens, notebook computers, and ultra-mobile personal computers (UMPC), netbooks, as well as cellular phones, personal digital assistants (PDAs), augmented reality (AR)/virtual reality (VR) devices, media players, wearable devices, digital cameras, car navigation system, etc.

In the circuit structures provided in the embodiments of the present application, nodes such as a first node and a second node do not indicate components that actually exist. Instead, they means meeting points of relevant couplings in the circuit diagram. That is to say, these nodes are equivalent nodes formed by relevant couplings in the circuit diagram.

In the circuit, at the time voltage conversion can be performed by using a voltage conversion chip U14 which is of a DC-TO-DC (boost or buck) type, a sampling resistor R58 is used for sampling at a voltage output end, and the sampled voltage is fed back to a voltage output pin of the voltage conversion chip U14 by using the sampling resistor R58. By using an internal comparator of the IC, the voltage is adjusted with an aid of feedback. As shown in FIG. 1, the external power supply voltage is input via a connector J10. The voltage enters a voltage input pin VIN of the voltage conversion chip U14 and then outputs by the voltage output pin VOUT of the voltage conversion chip U14. When VIN exceeds 5.5~6V, the voltage conversion chip U14 will cut off the power supply. Excessive high voltage will not flow into the internal circuit to avoid damaging the components in the circuit. However, in the overvoltage protection circuit shown in FIG. 1, the voltage conversion chip U14 is directly connected in series between the voltage input end and the voltage output end. The power supply voltage may be 5V. However, after the conversion of the voltage conversion chip U14, only 4.8V or 4.7V or even lower remains. This causes a certain voltage drop (such as 0.2V or 0.3V) between the input and the output of the voltage conversion chip U14.

The embodiments of the present application provide an overvoltage protection circuit. As shown in FIGS. 2 to 5, the overvoltage protection circuit includes:

a voltage input end Input, a voltage output end Output, a first control switch Q23 and a protection module 10;

the voltage input end Input is configured to be applied with a power supply voltage;

the voltage input end Input and the voltage output end Output are connected via a first line L1;

the first control switch Q23 is connected between the voltage input end Input and the voltage output end Output and is located on the first line L1;

the protection module 10 is connected between the voltage input end Input and the voltage output end Output and is located on a second line L2 connected in parallel with the first line L1, the protection module 10 is connected to the first control switch Q23, and the protection module 10 is configured to control the first control switch Q23 to turn off to be disconnected from the first line L1 when the power supply voltage is greater than a preset voltage.

Figure 2:
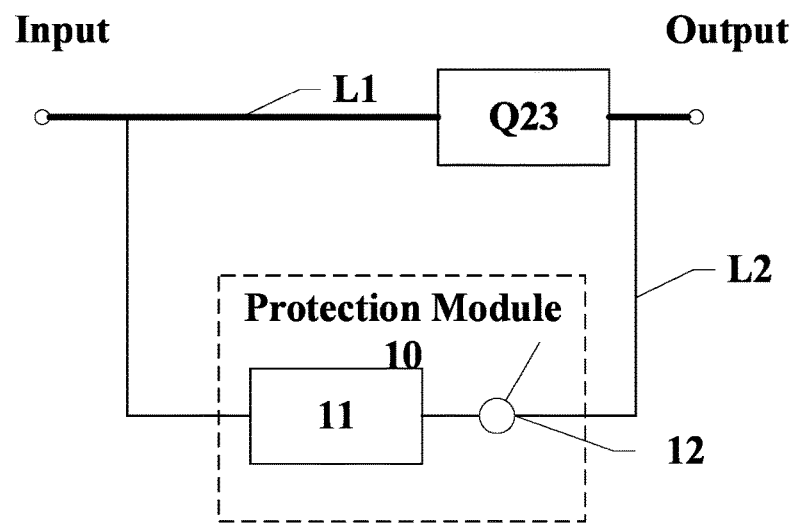
FIG. 2 is a schematic structural diagram of an overvoltage protection circuit in an embodiment of the present application.

Specifically, the preset voltage is a voltage that ensures that a load connected to the voltage output end Output can operate normally. There are two lines between the voltage input end Input and the voltage output end Output in this application. As shown in FIG. 2, one line is the first line L1 and the other line is the second line L2. On the first line L1, the voltage input end Input and the voltage output end Output are connected directly via the first control switch Q23. On the second line L2, the voltage input end Input and the voltage output end Output are connected via the protection module 10. In this way, both the first line L1 on which the first control switch Q23 is located and the second line L2 on which the protection module 10 is located are connected between the voltage input end Input and the voltage output end Output, and the first line L1 and the second line L2 are connected in parallel to form a close loop. The overvoltage protection circuit realizes real-time monitoring of the power supply voltage by using the protection module 10. When the power supply voltage is greater than the preset voltage, the protection module 10 controls the first control switch Q23 to break up the connection of first line L1 between the voltage input end Input and the voltage output end Output. That is, the first control switch Q23 is controlled to be turned off. Since the first control switch Q23 is located on the first line L1, the path of the first line L1 between the voltage input end Input and the voltage output end Output can be disconnected. This can not only realize accurate determination on overvoltage to activate a disconnection operation and prevent the voltage output end Output from outputting a voltage greater than the preset voltage to the connected load, but also avoid voltage loss at the voltage output end Output caused by the voltage drop of the protection module 10, maintaining the stability of input voltage of the load connected to the voltage output end Output.

In some embodiments, the protection module 10 includes:

a voltage conversion unit 11, configured to be applied with the power supply voltage and output a turn-off signal when the power supply voltage is greater than the preset voltage;

a switch unit 12, configured to control the first control switch to turn off when being applied with the turn-off signal, to be disconnected from the first line.

Specifically, as shown in FIG. 2, the voltage conversion unit 11 and the switch unit 12 are connected in series, and the voltage conversion unit 11 and the switch unit 12 are connected between the voltage input end Input and the voltage output end Output. That is to say, one end of the voltage conversion unit 11 is connected to the voltage input end Input to be applied with the power supply voltage, the other end of the voltage conversion unit 11 is connected to one end of the switch unit 12, and the other end of the switch unit 12 is connected to the voltage output end Output. The voltage output end Output can be connected to a load. In this way, a stable operating voltage can be output or provided to the load by the voltage output end Output of the overvoltage protection circuit.

The voltage conversion unit 11 compares the magnitude of the power supply voltage input from the voltage input end Input and the preset voltage. If the power supply voltage is greater than the preset voltage, the voltage conversion unit 11 will generate and output a turn-off signal to the connected switch unit 12. Since the switch unit 12 is located on the second line L2 and connected between the voltage input end Input and the voltage output end Output, the switch unit 12 switches to a disconnection state or a turn-off state when receiving the turn-off signal to control the first control switch Q23 to turn off, thereby controlling the first line L1 to be disconnected.

In some embodiments, the protection module 10 is further configured to:

control the first control switch to turn on when the power supply voltage is less than or equal to the preset voltage, to make the first line connected.

Specifically, there are two lines between the voltage input end Input and the voltage output end Output in this application. As shown in FIG. 2, one line is the first line L1 and the other line is the second line L2. On the first line L1, the voltage input end Input and the voltage output end Output are connected via the first control switch Q23. On the second line L2, the voltage input end Input and the voltage output end Output are connected via the protection module 10. In this way, the overvoltage protection circuit realizes real-time monitoring of the power supply voltage by using the protection module 10. When the power supply voltage is less than or equal to the preset voltage, the protection module 10 controls the first control switch Q23 to establish the connection of the first line L1 between the voltage input end Input and the voltage output end Output to ensure that the load connected to the voltage output end of the overvoltage protection circuit can operate normally.

In some embodiments, the voltage conversion unit 11 is further configured to output a turn-on signal when the power supply voltage is less than or equal to the preset voltage; the switch unit 12 is further configured to control the first control switch to turn on when being applied with the turn-on signal, to make the first line connected.

Specifically, as shown in FIG. 2, the voltage conversion unit 11 compares the magnitude of the power supply voltage input from the voltage input end Input and the preset voltage. If the power supply voltage is less than or equal to the preset voltage, the voltage conversion unit 11 will generate and output a turn-on signal to the connected switch unit 12. Since the switch unit 12 is located on the second line L2 and connected between the voltage input end Input and the voltage output end Output, the switch unit 12 switches to a connection state or a turn-on state when receiving the turn-on signal to control the first control switch Q23 to turn on, thereby controlling the first line L1 to be connected.

In some embodiments, the overvoltage protection circuit further includes:
- a second control switch Q21 having the same channel type as the first control switch Q23,
  wherein the second control switch Q21 is reversely connected to the first control switch Q23, and the second control switch Q21 is located on the first line L1 and connected between the voltage input end Input and the voltage output end Output.

Figure 3:
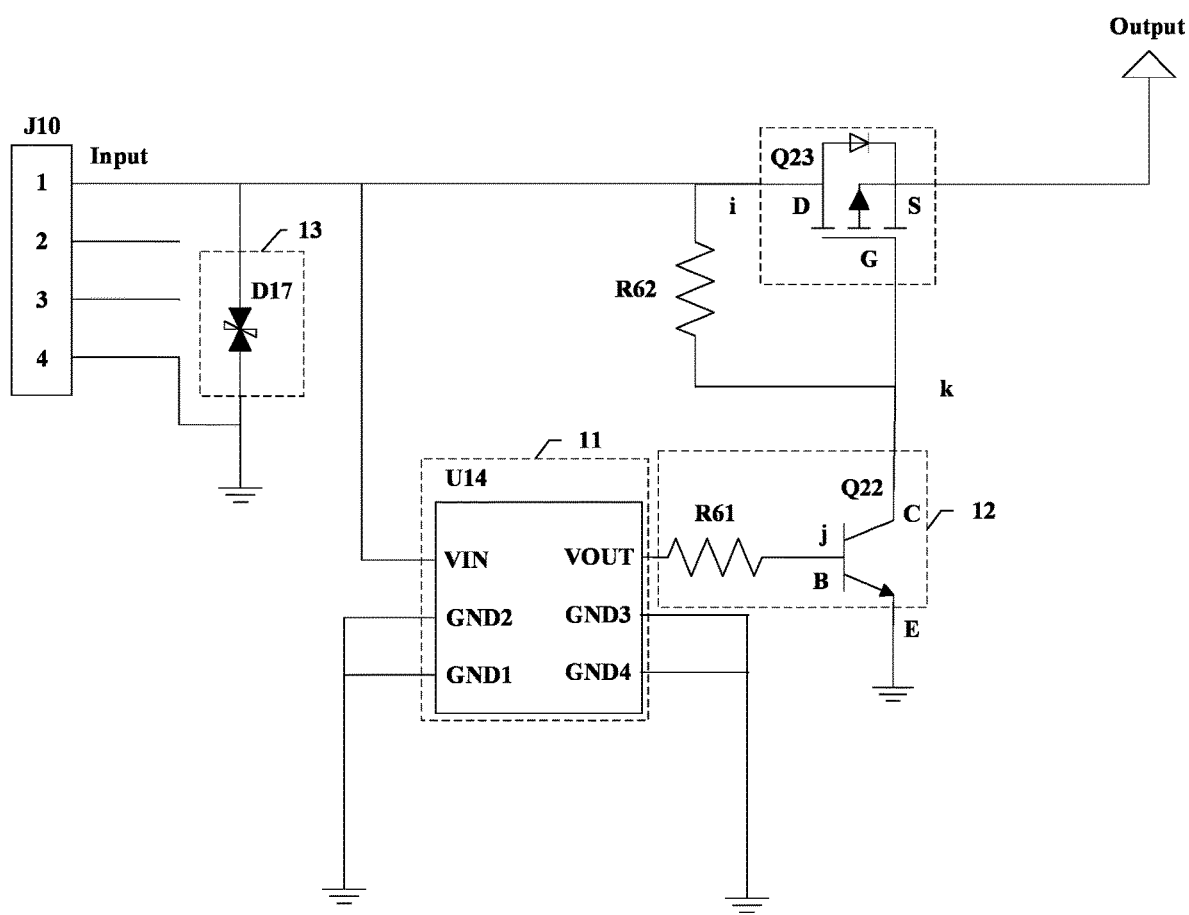
FIG. 3 is another structural schematic diagram of an overvoltage protection circuit in an embodiment of the present application.
Figure 4:
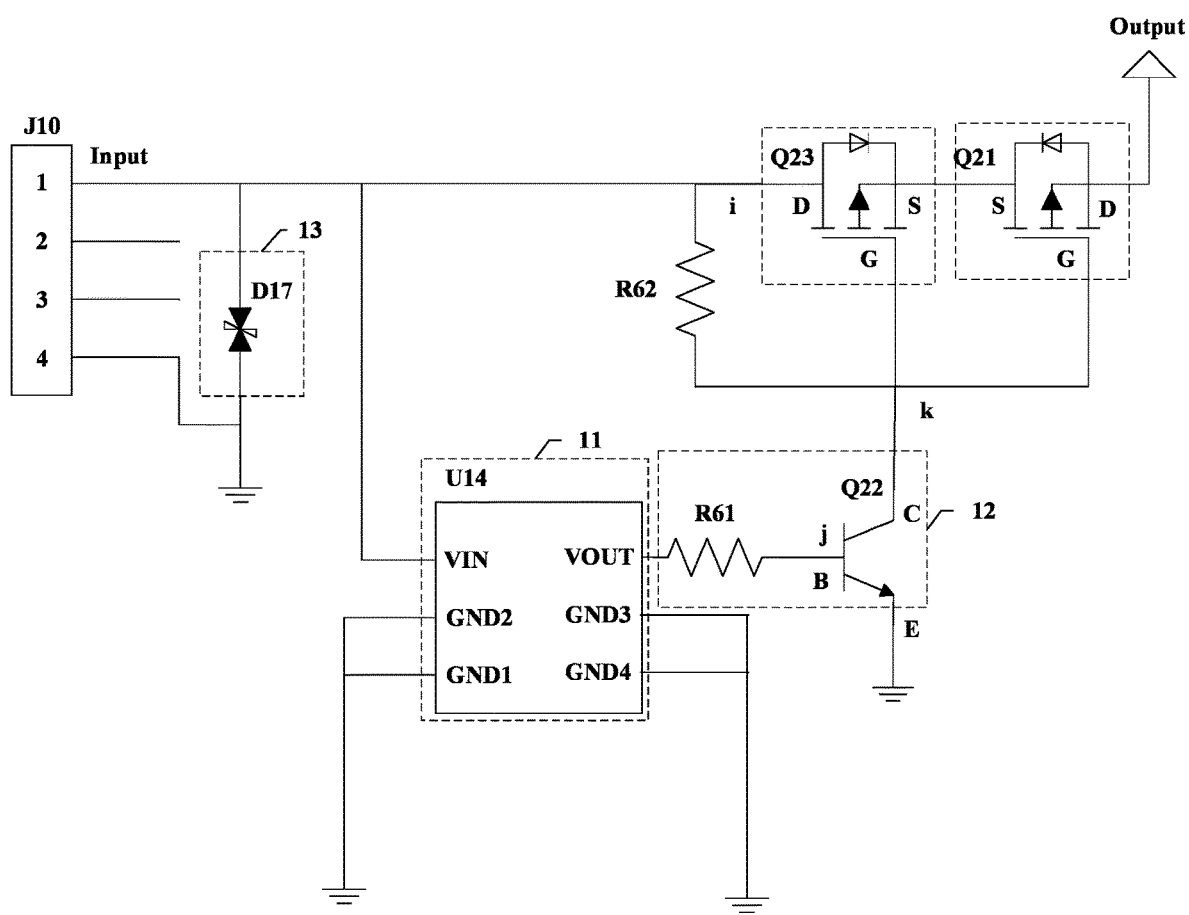
FIG. 4 is a schematic diagram illustrating the principle of an overvoltage protection circuit in an embodiment of the present application.
Figure 5:
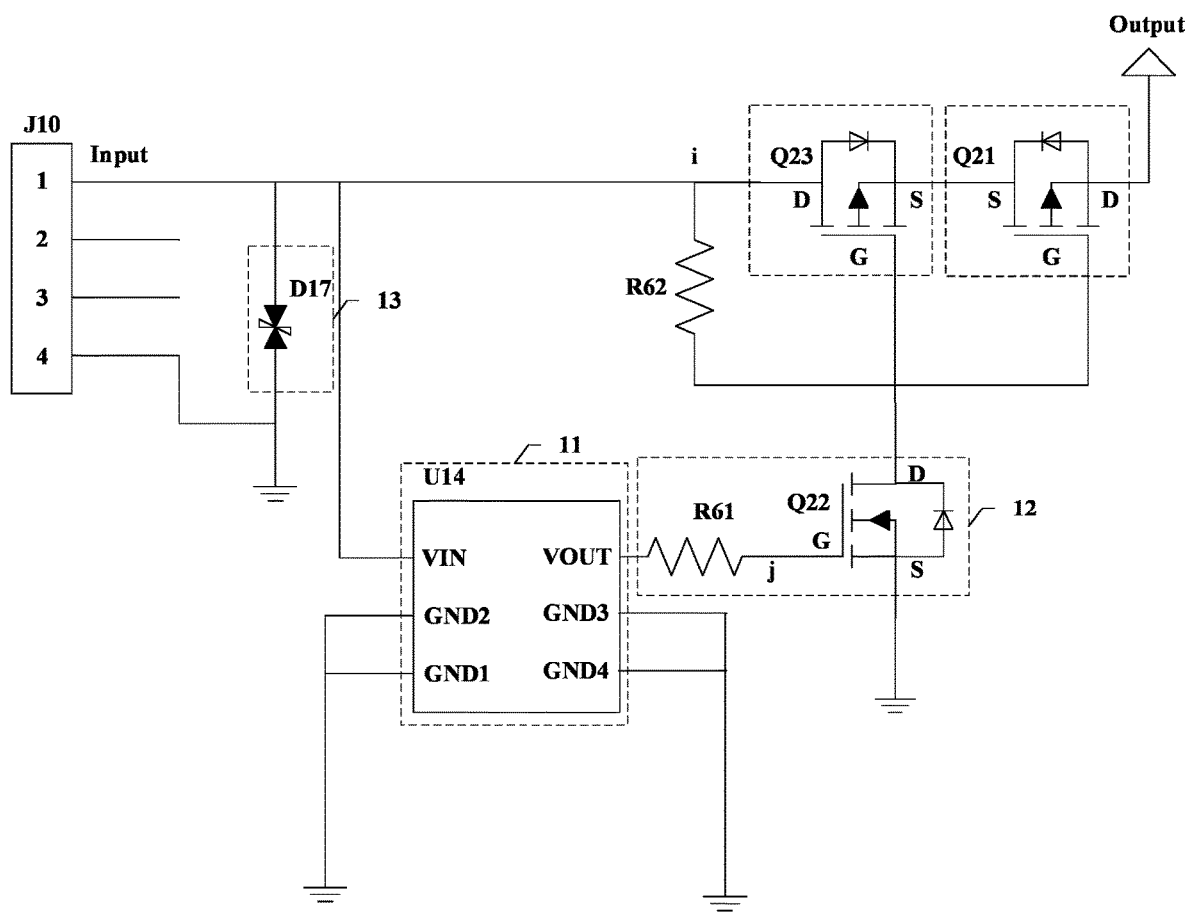
FIG. 5 is another schematic diagram illustrating the principle of an overvoltage protection circuit in an embodiment of the present application.

Specifically, as shown in FIG. 3, there can be only one first control switch Q23 connected in series on the first line L1. Of course, there can be only one second control switch Q21 connected in series on the first line L1. As shown in FIGS. 4 and 5, it shows that one first control switch Q23 and one second control switch Q21 can be connected in series on the first line L1. In this application, the switch state of the first control switch Q23 located on the first line L1 can be controlled by the protection module 10 located on the second line L2 such that the first line L1 between the voltage input end Input and the voltage output end Output is controlled to be disconnected. Of course, in the embodiments of the present application, the switch state of the second control switch Q21 on the first line L1 can be controlled by the protection module 10 on the second line L2 such that the first line L1 between the voltage input end Input and the voltage output end Output is controlled to be disconnected.

In this application, the second control switch Q21 is reversely connected to the first control switch Q23 to prevent current backflow, avoiding damage to the load connected to the voltage output end Output and improving the safety of the load being applied with electricity.

In some embodiments, the voltage conversion unit 11 includes a voltage conversion chip U14, and the switch unit 12 includes a first resistor R61 and a third control switch Q22;
- a voltage input pin VIN of the voltage conversion chip U14 is applied with the power supply voltage;
- a voltage output pin VOUT of the voltage conversion chip U14 is connected to one end of the first resistor R61 to output the turn-off signal or the turn-on signal;
- the other end of the first resistor R61 is connected to a first electrode of the third control switch Q22, and a second electrode of the third control switch Q22 is grounded;
- a third electrode of the third control switch Q22 is connected to the first electrode of the first control switch Q23.

Specifically, as shown in FIGS. 4 and 5, the voltage input pin VIN of the voltage conversion chip U14 is connected to the voltage input end Input to be applied with the power supply voltage, the voltage output pin VOUT of the voltage conversion chip U14 is connected to one end of the first resistor R61, and the other end of the first resistor R61 is connected to the first electrode of the third control switch Q22. In this way, the outputted the turn-off signal or turn-on signal is transmitted to the third control switch Q22 via the first resistor R61. Ground pins of the voltage conversion chip U14 are grounded. The voltage conversion chip U14 stores the preset voltage internally. In this way, after the voltage input pin VIN of the voltage conversion chip U14 is applied with the power supply voltage, the voltage conversion chip U14 compares the power supply voltage with the preset voltage. In this way, if the power supply voltage is less than or equal to the preset voltage, the voltage conversion unit 11 will generate and output the turn-on signal. On the contrary, if the power supply voltage is greater than the preset voltage, the voltage conversion unit 11 will generate and output the turn-off signal. The third electrode of the third control switch Q22 is connected to the first electrode of the first control switch Q23 and the first electrode of the second control switch Q21. In this way, the third control switch Q22 can control the first control switch Q23 or the second control switch Q21 to turn off, thereby causing the first line L1 to be disconnected. The third control switch Q22 can also be used to control the first control switch Q23 or the second control switch Q21 to turn on, thereby causing the first line L1 to be connected.

In this application, a first resistor R61 is connected in series between the voltage conversion chip U14 and the third control switch Q22. The first resistor R61 can prevent damage to the third control switch Q22 connected to the first resistor R61 due to excessive current and protect the third control switch Q22 from being broken down and burn out due to excessive current, so that the third control switch Q22 can operate normally.

In some embodiments, if the third control switch Q22 is an N-type MOS transistor and the first control switch Q23 is a P-type MOS transistor, then the first electrode, the second electrode and the third electrode of the third control switch Q22 are a gate electrode, a source electrode and a drain electrode respectively, and the first electrode, the second electrode and the third electrode of the first control switch Q23 are the gate electrode, the drain electrode and the source electrode respectively. As shown in FIG. 4, since the second control switch Q22 is connected reversely with the first control switch Q23 and the channel type of the second control switch Q21 is the same as the channel type of the first control switch Q23, the second control switch Q21 is also a P-type MOS transistor, and the first electrode, the second electrode and the third electrode of the second control switch Q21 are the gate electrode, the drain electrode and the source electrode respectively.

In some embodiments, the overvoltage protection circuit further includes a second resistor R62,
- one end of the second resistor R62 is connected to the voltage input end Input, the voltage input pin VIN and the second electrode of the first control switch Q23;
- the other end of the second resistor R62 is connected to the first electrode of the first control switch R23 and the first electrode of the third control switch Q22.

In some embodiments, if the third control switch Q22 is an NPN transistor and the first control switch Q23 is a P-type MOS transistor, then the first electrode, the second electrode and the third electrode of the third control switch Q22 are a base electrode, an emitter electrode and a collector electrode respectively, and the first electrode, the second electrode and the third electrode of the first control switch Q23 are a gate electrode, a drain electrode and a source electrode respectively. As shown in FIG. 5, since the second control switch Q22 is connected reversely with the first control switch Q23 and the channel type of the second control switch Q21 is the same as the channel type of the first control switch Q23, the second control switch Q21 is also a P-type MOS transistor, and the first electrode, the second electrode and the third electrode of the second control switch Q21 are the gate electrode, the drain electrode and the source electrode respectively.

Specifically, as shown in FIG. 5, the third control switch Q22 is an N-type MOS transistor, and both the first control switch Q23 and the second control switch Q21 are P-type MOS transistors. As shown in FIG. 4, the third control switch Q22 is an NPN transistor, and both the first control switch Q23 and the second control switch Q21 are P-type MOS transistors.

Specifically, the first control switch Q23 and the second control switch Q21 are arranged in series on the first line L1. The first control switch Q23 and the second control switch Q21 are connected reversely, and the second resistor R62 is connected in parallel with the first control switch Q23 and the second control switch Q21. One end of the second resistor R62 is connected to the voltage input end Input, the voltage input pin VIN and the second electrode of the first control switch Q23, and the other end of the second resistor R62 is also connected to the first electrode of the second control switch Q21, the third electrode of the first control switch Q23 and the third electrode of the second control switch Q21. The second electrode of the second control switch Q21 is connected to the voltage output end Output.

In this application, a second resistor R62 is connected in series between the voltage input end Input and the first electrode (i.e., the gate electrode) of the second control switch Q21. The second resistor R62 can prevent damage to the second control switch Q21 connected to the second resistor R62 due to excessive current and protect the second control switch Q21 from being broken down and burn out due to excessive current, such that the second control switch Q21 can operate normally, thereby indirectly protecting the first control switch Q23 reversely connected in series with the second control switch Q21.

When the voltage input end Input starts to be applied with the power supply voltage, the voltage level of a first node i increases, the first control switch Q23 switches to a turn-on state, and the second control switch Q21 switches to a turn-on state. Since the first control switch Q23 and the second control switch Q21 are reversely connected in series between the voltage input end Input and the voltage output end Output, switching both the first control switch Q23 and the second control switch Q21 to the turn-on state makes the first line L1 switch to a connection state. In addition, when the third control switch Q22 receives a high-voltage-level turn-on signal, it indicates that the voltage level of a second node j increases. Accordingly, the third control switch Q22 is turned on and pulled down to the ground GND. Meanwhile, a third node k connected to the gate electrode of the first control switch Q23 and the gate electrode of the second control switch Q21 is at a low voltage level such that both the first control switch Q23 and the second control switch Q21 are turned on, thereby making the first line L1 be in the connection state.

When the third control switch Q22 receives a low-voltage-level turn-off signal, it indicates that the voltage level of the second node j decreases. Accordingly, the third control switch Q22 is cut off or turned off. Meanwhile, the third node k connected to the gate electrode of the first control switch Q23 and the gate electrode of the second control switch Q21 is at a high voltage level such that both the first control switch Q23 and the second control switch Q21 are cut off or turned off, thereby making the first line L1 be in a disconnection state.

Even if there is an external voltage that makes an electric current inject from the voltage output end Output and flow through a diode inside the second control switch Q21 to reach the source electrode of the first control switch Q23, since the diode of the first control switch Q23 is reversely connected with respect to the diode of the second control switch Q21, the electric current is cut off when it reaches the source electrode of the first control switch Q23. Similarly, even if there is a voltage that makes an electric current input from the voltage input end Input to the drain electrode of the first control switch Q23 and flow through a diode inside the first control switch Q23 to reach the source electrode of the second control switch Q21, since the diode of the second control switch Q21 is reversely connected with respect to the diode of the first control switch Q23, the electric current is cut off when it reaches the source electrode of the second control switch Q21, thereby preventing the electric current from being flowed back and achieving the purpose of preventing the electric current from being flowed back.

When the voltage input end Input stops being applied with the power supply voltage, the voltage level of the first node i decreases, the first control switch Q23 switches to a turn-off state, and the second control switch Q21 switches to a turn-on state. Since the first control switch Q23 and the second control switch Q21 are reversely connected in series between the voltage input end Input and the voltage output end Output, switching the first control switch Q23 to the turn-on state makes the first line L1 switch to a disconnection state, preventing the electric current from flowing back to the voltage input end Input via the first line L1.

Specifically, the anti-backflow design is a common circuit protection technique. Its function is to prevent the electric current from flowing back in the circuit, thereby protecting the components in the circuit from damage. In a circuit, when the power is shut down, a reverse current flowing from high voltage level to low voltage level is formed. This is a backflow current. If such a reverse current is too large, it will cause damage to the components in the circuit and even cause the circuit to malfunction. The current flowing into the inside of IC is a backflow phenomenon, that is, the current always flows to a place with low voltage level. As shown in FIG. 1, when an external power supply does not supply power to the voltage input end Input, that is, when the voltage input end Input stops being applied with the power supply voltage, the internal voltage in the circuit will flow back to the voltage input end Input. A switch formed by the first control switch Q23 and the second control switch Q21 connected reversely in series with each other achieves the purpose of preventing current backflow, effectively solves the abnormal backflow problem and even avoids fire ignition or explosion. The circuit design is simple, with low manufacturing cost and high practicability. The anti-backflow design can effectively protect the components in the circuit and prevent damage from the reverse current. It can not only improve the reliability and stability of the circuit, but also extend the service life of electronic equipments.

In some embodiments, the protection module 10 further includes a bidirectional transient-voltage-suppression diode D17;

one end of the bidirectional transient-voltage-suppression diode D17 is connected to the voltage input end Input, the voltage input pin VIN and the voltage output end Output;

the other end of the bidirectional transient-voltage-suppression diode D17 is grounded.

Specifically, the bidirectional transient-voltage-suppression diode D17 is a device used to protect the circuit from suffering overvoltage damage and is used to eliminate the impact of sudden or instant overvoltage on sensitive semiconductors and circuits. In this application, by arranging the bidirectional transient-voltage-suppression diode D17 in the connection path of the voltage input end Input and the voltage input pin VIN, it can be determined there exits overvoltage inside the circuit when the voltage conversion chip U14 determines that the power supply voltage is greater than the preset voltage. The bidirectional transient-voltage-suppression diode D17 turns on quickly and guides the overvoltage to the a grounded wire or a power line to which it is connected, thereby protecting other devices in the overvoltage protection circuit or the load connected to the voltage output end Output from being damaged.

The embodiments of the present application also provide a display panel, which includes the afore-described overvoltage protection circuit in the embodiments corresponding to FIGS. 2 to 5, respectively.

In this application, two MOS transistors of the same channel type and a triode, or three MOS transistors of the same channel type are used to optimize the overvoltage protection circuit to achieve stable input voltage and avoid voltage from being reversely applied. In this application, the input of power supply voltage is protected from overvoltage indirectly by the voltage conversion chip U14 to prevent the voltage drop between the input and output of the voltage conversion chip U14 to lose a part of the voltage. Instead, it is to use the voltage output pin of the voltage conversion chip U14 to control the third control switch Q22 to turn on or off so as to control the on and off of the first control switch Q23 and the second control switch Q21 reversely connected in series on the first line L1 to realize the on and off of the power supply and achieve the purpose of overvoltage protection. In addition, for the first control switch Q23 and the second control switches Q21 reversely connected in series on the first line L1, the first control switch Q23 and the second control switch Q21 are turned off when the voltage input end is not applied with the power supply voltage. Two equivalent diodes reversely connected in series make the first line be disconnected, thereby preventing the electric current from flowing back to the voltage input end. This application can have an overvoltage protection function to avoid voltage loss, keep voltage stable and prevent internal voltage from being applied reversely.

In the above embodiments, different emphasis is placed on respective embodiments, and reference may be made to related depictions in other embodiments for portions not detailed in a certain embodiment.

Hereinbefore, the overvoltage protection circuit and the display panel provided in the embodiments of the present application are introduced in detail, the principles and implementations of the embodiments are set forth herein with reference to specific examples, descriptions of the above embodiments are merely served to assist in understanding the technical solutions and essential ideas of the present application. Those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present application.

What is claimed is:

1. An overvoltage protection circuit, comprising:
    a voltage input end, a voltage output end, a first control switch and a protection module;
    the voltage input end is configured to be applied with a power supply voltage;
    the voltage input end and the voltage output end are connected via a first line;
    the first control switch is connected between the voltage input end and the voltage output end and is located on the first line;
    the protection module is connected between the voltage input end and the voltage output end and is located on a second line connected in parallel with the first line, the protection module is connected to the first control switch, and the protection module is configured to control the first control switch to turn off to be disconnected from the first line when the power supply voltage is greater than a preset voltage;
    wherein the protection module comprises:
    a voltage conversion unit, configured to be applied with the power supply voltage and output a turn-off signal when the power supply voltage is greater than the preset voltage;
    a switch unit, configured to control the first control switch to turn off when being applied with the turn-off signal, to be disconnected from the first line;
    wherein the voltage conversion unit comprises a voltage conversion chip, and the switch unit comprises a first resistor and a third control switch;
    a voltage input pin of the voltage conversion chip is applied with the power supply voltage;
    a voltage output pin of the voltage conversion chip is connected to one end of the first resistor to output the turn-off signal or a turn-on signal;
    the other end of the first resistor is connected to a first electrode of the third control switch, and a second electrode of the third control switch is grounded;
    a third electrode of the third control switch is connected to the first electrode of the first control switch.

2. The overvoltage protection circuit according to claim 1, wherein:
    the voltage conversion unit is further configured to output a turn-on signal when the power supply voltage is less than or equal to the preset voltage;
    the switch unit is further configured to control the first control switch to turn on when being applied with the turn-on signal, to be connected to the first line.

3. The overvoltage protection circuit according to claim 1, further comprising: a second control switch having the same channel type as the first control switch,
    wherein the second control switch is reversely connected to the first control switch, and the second control switch is located on the first line and connected between the voltage input end and the voltage output end.

4. The overvoltage protection circuit according to claim 1, further comprising a second resistor,
    one end of the second resistor is connected to the voltage input end, the voltage input pin and the second electrode of the first control switch;
    the other end of the second resistor is connected to the first electrode of the first control switch and the first electrode of the third control switch.

5. The overvoltage protection circuit according to claim 1, wherein:
    if the third control switch is an N-type MOS transistor and the first control switch is a P-type MOS transistor, then the first electrode, the second electrode and the third electrode of the third control switch are a gate electrode, a source electrode and a drain electrode respectively, and the first electrode, the second electrode and the third electrode of the first control switch are the gate electrode, the drain electrode and the source electrode respectively.

6. The overvoltage protection circuit according to claim 1, wherein:
if the third control switch is an NPN transistor and the first control switch is a P-type MOS transistor, then the first electrode, the second electrode and the third electrode of the third control switch are a base electrode, an emitter electrode and a collector electrode respectively, and the first electrode, the second electrode and the third electrode of the first control switch are a gate electrode, a drain electrode and a source electrode respectively.

7. The overvoltage protection circuit according to claim 1, wherein the protection module further comprises a bidirectional transient-voltage-suppression diode;
one end of the bidirectional transient-voltage-suppression diode is connected to the voltage input end, the voltage input pin and the voltage output end;
the other end of the bidirectional transient-voltage-suppression diode is grounded.

8. A display panel, comprising an overvoltage protection circuit, which comprises:
a voltage input end, a voltage output end, a first control switch and a protection module;
the voltage input end is configured to be applied with a power supply voltage;
the voltage input end and the voltage output end are connected via a first line;
the first control switch is connected between the voltage input end and the voltage output end and is located on the first line;
the protection module is connected between the voltage input end and the voltage output end and is located on a second line connected in parallel with the first line, the protection module is connected to the first control switch, and the protection module is configured to control the first control switch to turn off to be disconnected from the first line when the power supply voltage is greater than a preset voltage;
wherein the protection module comprises:
a voltage conversion unit, configured to be applied with the power supply voltage and output a turn-off signal when the power supply voltage is greater than the preset voltage;
a switch unit, configured to control the first control switch to turn off when being applied with the turn-off signal, to be disconnected from the first line;
wherein the voltage conversion unit comprises a voltage conversion chip, and the switch unit comprises a first resistor and a third control switch;
a voltage input pin of the voltage conversion chip is applied with the power supply voltage;
a voltage output pin of the voltage conversion chip is connected to one end of the first resistor to output the turn-off signal or a turn-on signal;
the other end of the first resistor is connected to a first electrode of the third control switch, and a second electrode of the third control switch is grounded;
a third electrode of the third control switch is connected to the first electrode of the first control switch.

9. The display panel according to claim 8, wherein:
the voltage conversion unit is further configured to output a turn-on signal when the power supply voltage is less than or equal to the preset voltage;
the switch unit is further configured to control the first control switch to turn on when being applied with the turn-on signal, to be connected to the first line.

10. The display panel according to claim 8, further comprising: a second control switch having the same channel type as the first control switch,
wherein the second control switch is reversely connected to the first control switch, and the second control switch is located on the first line and connected between the voltage input end and the voltage output end.

11. The display panel according to claim 8, further comprising a second resistor,
one end of the second resistor is connected to the voltage input end, the voltage input pin and the second electrode of the first control switch;
the other end of the second resistor is connected to the first electrode of the first control switch and the first electrode of the third control switch.

12. The display panel according to claim 8, wherein:
if the third control switch is an N-type MOS transistor and the first control switch is a P-type MOS transistor, then the first electrode, the second electrode and the third electrode of the third control switch are a gate electrode, a source electrode and a drain electrode respectively, and the first electrode, the second electrode and the third electrode of the first control switch are the gate electrode, the drain electrode and the source electrode respectively.

13. The display panel according to claim 8, wherein:
if the third control switch is an NPN transistor and the first control switch is a P-type MOS transistor, then the first electrode, the second electrode and the third electrode of the third control switch are a base electrode, an emitter electrode and a collector electrode respectively, and the first electrode, the second electrode and the third electrode of the first control switch are a gate electrode, a drain electrode and a source electrode respectively.

14. The display panel according to claim 8, wherein the protection module further comprises a bidirectional transient-voltage-suppression diode;
one end of the bidirectional transient-voltage-suppression diode is connected to the voltage input end, the voltage input pin and the voltage output end;
the other end of the bidirectional transient-voltage-suppression diode is grounded.

* * * * *